(12) United States Patent
Kucherov

(10) Patent No.: US 10,691,354 B1
(45) Date of Patent: Jun. 23, 2020

(54) METHOD AND SYSTEM OF DISK ACCESS PATTERN SELECTION FOR CONTENT BASED STORAGE RAID SYSTEM

(71) Applicant: EMC IP Holding Company LLC, Hopkinton, MA (US)

(72) Inventor: Anton Kucherov, Milford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 225 days.

(21) Appl. No.: 15/885,290

(22) Filed: Jan. 31, 2018

(51) Int. Cl.
*G06F 3/06* (2006.01)

(52) U.S. Cl.
CPC .......... *G06F 3/0622* (2013.01); *G06F 3/0613* (2013.01); *G06F 3/0665* (2013.01); *G06F 3/0689* (2013.01)

(58) Field of Classification Search
CPC .... G06F 3/0622; G06F 3/0665; G06F 3/0689; G06F 3/0613
USPC ......................................................... 711/114
See application file for complete search history.

(56) References Cited

U.S. PATENT DOCUMENTS

| 5,537,534 | A  | 7/1996  | Voigt et al.    |
|-----------|----|---------|-----------------|
| 5,694,619 | A  | 12/1997 | Konno           |
| 6,691,209 | B1 | 2/2004  | O'Connell       |
| 6,711,649 | B1 | 3/2004  | Bachmat et al.  |
| 7,363,451 | B2 | 4/2008  | Kolli et al.    |
| 8,335,899 | B1 | 12/2012 | Meiri et al.    |
| 8,478,955 | B1 | 7/2013  | Natanzon et al. |
| 8,880,788 | B1 | 11/2014 | Sundaram et al. |
| 8,990,495 | B2 | 3/2015  | Hallak et al.   |
| 9,104,326 | B2 | 8/2015  | Frank et al.    |
| 9,141,290 | B2 | 9/2015  | Hallak et al.   |
| 9,170,757 | B1 | 10/2015 | Shihadeh et al. |
| 9,569,771 | B2 | 2/2017  | Lesavich et al. |
| 9,606,870 | B1 | 3/2017  | Meiri et al.    |
| 10,055,161| B1 | 8/2018  | Meiri et al.    |

(Continued)

OTHER PUBLICATIONS

Goel et al. "SCADDER: An Efficient Randomized Technique to Reorganize Continuous Media Blocks", Proceedings of the 18th International Conference on Data Engineering (ICDE'02) 2002 (Year: 2002).*

(Continued)

*Primary Examiner* — David Yi
*Assistant Examiner* — Zubair Ahmed
(74) *Attorney, Agent, or Firm* — Daly Crowley Mofford & Durkee, LLP

(57) ABSTRACT

A disk access request is received at a storage system comprising a plurality of disks, from an entity having a substantially unique identifier. A finite field is defined, corresponding to the plurality of disks and based on the storage system array access width. A substantially unique sequence interval is computed, associated with the finite field and based on the substantially unique identifier and the array access width. A respective disk access sequence is generated, defining a disk access pattern the entity to access all disks in the array, wherein the sequence directs the entity to access at least the disks in a predetermined order that increments from a starting point to subsequent disks in accordance with the sequence interval, such that, when the disk access sequence is complete, the respective entity has accessed each disk in the portion of the plurality of disks only a predetermined number of times.

20 Claims, 7 Drawing Sheets

(56) References Cited

U.S. PATENT DOCUMENTS

| | | | |
|---|---|---|---|
| 2008/0082736 | A1 | 4/2008 | Chow et al. |
| 2009/0172273 | A1 | 7/2009 | Piszczek et al. |
| 2009/0248986 | A1 | 10/2009 | Citron et al. |
| 2010/0161884 | A1 | 6/2010 | Kurashige |
| 2010/0287427 | A1 | 11/2010 | Kim et al. |
| 2011/0126045 | A1 | 5/2011 | Bennett |
| 2012/0290798 | A1 | 11/2012 | Huang et al. |
| 2013/0227346 | A1 | 8/2013 | Lee |
| 2013/0238571 | A1 | 9/2013 | Bates et al. |
| 2013/0305002 | A1 | 11/2013 | Hallak et al. |
| 2014/0082261 | A1 | 3/2014 | Cohen et al. |
| 2015/0134880 | A1 | 5/2015 | Danilak et al. |
| 2015/0193342 | A1 | 7/2015 | Ohara et al. |
| 2016/0004642 | A1 | 1/2016 | Sugimoto et al. |
| 2016/0246678 | A1* | 8/2016 | Galbraith .............. G06F 3/0619 |
| 2018/0276224 | A1 | 9/2018 | Natanzon |

OTHER PUBLICATIONS

"Optimal Disk Allocation for Partial Match Queries", Abdel-Ghaffar et al., ACM Transactions on Database Systems, Mar. 1993, pp. 132-156 (Year: 1993).*

Notice of Allowance dated Apr. 4, 2019 for U.S. Appl. No. 15/885,027; 8 pages.

Benvenuto; Galois Field in Cryptography. May 31, 2012. 11 pages.

Finite Field; Wikipedia Definition [https://en.wikipedia.org/wiki/Finite_field]. 7 pages.

Goel et al.; SCADDAR: An Efficient Randomized Technique to Reorganize Continuous Media Blocks. Published in Data Engineering, 2002; 10 pages.

Gulati, et al; BASIL: Automated IO Load Balancing Across Storage Devices. Feb. 23, 2010; 14 Pages.

Ishikawa; ASURA: Scalable and Uniform Data Distribution Algorithm for Storage Clusters; System Platform Research Laboratories, NEC Corporation. Sep. 30, 2013. 14 pages.

Kak; Theoretical Underpinnings of Modern Cryptography [Lecture 7: Finite Fields (Part 4)] Jan. 28, 2017; 42 pages.

Kerl; Computation in Finite Fields [Arizona State University and Lockheed Martin Corporation]; Apr. 2004. 91 pages.

PowerVault™ MD3200 and MD3200i: Array Tuning Best Practices. A Dell Technical White Paper. Jun. 2010: 21 pages.

U.S. Appl. No. 15/499,297, filed Apr. 27, 2017, Kucherov, et al.

U.S. Appl. No. 15/499,303, filed Apr. 27, 2017, Kucherov, et al.

U.S. Appl. No. 15/885,027, filed Jan. 31, 2018, Chen, et al.

Sameki, et al.; An IO Scheduling Algorithm to Improve Performance of Flash-Based Solid State Disks. 2014. 8 pages.

Non Final Office Action dated Jan. 6, 2020 for U.S. Appl. No. 15/001,789; 5 pages.

U.S. Non-Final Office Action dated Sep. 9, 2016 for U.S. Appl. No. 15/001,789; 15 Pages.

Response to U.S. Non-Final Office Action dated Sep. 9, 2016 for U.S. Appl. No. 15/001,789; Response filed Dec. 8, 2016; 15 Pages.

U.S. Appl. No. 15/001,789, filed Jan. 20, 2016, Meiri et al.

U.S. Final Office Action dated Mar. 9, 2017 for U.S. Appl. No. 15/001,789; 35 Pages.

Response to U.S. Final Office Action dated Mar. 9, 2017 for U.S. Appl. No. 15/001,789; Response filed Jun. 9, 2017; 12 Pages.

U.S. Non-Final Office Action dated Oct. 31, 2017 for U.S. Appl. No. 15/001,789; 38 Pages.

Response to U.S. Non-Final Office Action dated Oct. 31, 2017 for U.S. Appl. No. 15/001,789; Response filed Jan. 30, 2018; 9 Pages.

U.S. Final Office Action dated Apr. 18, 2018 for U.S. Appl. No. 15/001,789; 34 Pages.

Response to U.S. Final Office Action dated Apr. 18, 2018 for U.S. Appl. No. 15/001,789; Response filed Aug. 20, 2018; 11 Pages.

U.S. Non-Final Office Action dated Nov. 28, 2018 for U.S. Appl. No. 15/001,789; 27 Pages.

Response to U.S. Non-Final Office Action dated Nov. 28, 2018 for U.S. Appl. No. 15/001,789; Response filed Feb. 20, 2019; 11 Pages.

U.S. Final Office Action dated May 30, 2019 for U.S. Appl. No. 15/001,789; 25 Pages.

Response to U.S. Final Office Action dated May 30, 2019 for U.S. Appl. No. 15/001,789; Response filed Aug. 27, 2019; 11 Pages.

U.S. Non-Final Office Action dated Sep. 22, 2016 for U.S. Appl. No. 15/001,784; 15 Pages.

Response to U.S. Non-Final Office Action dated Sep. 22, 2016 for U.S. Appl. No. 15/001,784; Response filed Dec. 8, 2016; 16 Pages.

U.S. Final Office Action dated Feb. 22, 2017 for U.S. Appl. No. 15/001,784; 10 Pages.

Appeal Brief filed on Jul. 19, 2017 for U.S. Appl. No. 15/001,784; 18 Pages.

U.S. Notice of Allowance ($1^{st}$) dated Nov. 28, 2017 for U.S. Appl. No. 15/001,784; 9 Pages.

U.S. Notice of Allowance ($2^{nd}$) dated May 8, 2018 for U.S. Appl. No. 15/001,784; 9 Pages.

U.S. Non-Final Office Action dated Dec. 1, 2015 for U.S. Appl. No. 14/230,405; 9 Pages.

Response to U.S. Non-Final Office Action dated Dec. 1, 2015 for U.S. Appl. No. 14/230,405; Response filed May 2, 2016; 8 Pages.

U.S. Final Office Action dated Jul. 29, 2016 for U.S. Appl. No. 14/230,405; 21 Pages.

Response to U.S. Final Office Action dated Jul. 29, 2016 for U.S. Appl. No. 14/230,405; Response filed Oct. 6, 2016; 9 Pages.

U.S. Final Office Action dated Nov. 16, 2016 for U.S. Appl. No. 14/230,405; 23 Pages.

Response to U.S. Final Office Action dated Nov. 16, 2016 for U.S. Appl. No. 14/230,405; Response filed Dec. 1, 2016; 8 Pages.

U.S. Notice of Allowance dated Jan. 25, 2017 for U.S. Appl. No. 14/230,405; 8 Pages.

Response to Non-Final Office Action dated Mar. 30, 2020 for U.S. Appl. No. 15/001,789; 11 Pages.

* cited by examiner

| Writer_id | writer_A | writer_B | writer_C | writer_D | writer_E | writer_F | writer_G | writer_H | writer_I | writer_J |
|---|---|---|---|---|---|---|---|---|---|---|
| Hop H | 1 | 2 | 3 | 4 | 5 | 6 | 7 | 8 | 9 | 10 |
| Start point (disk #) | 3 | 5 | 1 | 0 | 7 | 10 | 1 | 4 | 8 | 2 |
| 1st cycle (disk #) | 4 | 7 | 4 | 4 | 1 | 5 | 8 | 1 | 6 | 1 |
| 2nd cycle (disk #) | 5 | 9 | 7 | 8 | 6 | 0 | 4 | 9 | 4 | 0 |
| 3rd cycle (disk #) | 6 | 0 | 10 | 1 | 0 | 6 | 0 | 6 | 2 | 10 |
| 4th cycle (disk #) | 7 | 2 | 2 | 5 | 5 | 1 | 7 | 3 | 0 | 9 |
| 5th cycle (disk #) | 8 | 4 | 5 | 9 | 10 | 7 | 3 | 0 | 9 | 8 |
| 6th cycle (disk #) | 9 | 6 | 8 | 2 | 4 | 2 | 10 | 8 | 7 | 7 |
| 7th cycle (disk #) | 10 | 8 | 0 | 6 | 9 | 8 | 6 | 5 | 5 | 6 |
| 8th cycle (disk #) | 0 | 10 | 3 | 10 | 3 | 3 | 2 | 2 | 3 | 5 |
| 9th cycle (disk #) | 1 | 1 | 6 | 3 | 8 | 9 | 9 | 10 | 1 | 4 |
| 10th cycle (disk #) | 2 | 3 | 9 | 7 | 2 | 4 | 5 | 7 | 10 | 3 |
| 11th cycle (disk #) | 3 | 5 | 1 | 0 | 7 | 10 | 1 | 4 | 8 | 2 |

Field: P = {D0, D1, D2, D3, D4, D5, D6, D7, D8, D9, D10}

FIG. 6

METHOD AND SYSTEM OF DISK ACCESS PATTERN SELECTION FOR CONTENT BASED STORAGE RAID SYSTEM

FIELD

This application relates at least generally to devices, systems, and methods for data storage in computer systems. More particularly, this application relates at least to ways to improve efficiency in accessing data stored in content-addressable storage.

BACKGROUND

Computer data is vital to today's organizations, and content-based storage (sometimes referred to as content-addressable storage or CAS) content addressable storage system (such as DELL EMC XTREMIO) (hereinafter "XtremIO") can support a rich set of advanced data services such as single data instance, compression, snapshots, etc., by decoupling storage access, logical volume address space, and physical on-disk location of data. Content-based storage stores data based on its content, and in certain configurations provides benefits such as providing inherent data deduplication and facilitating in-line data compress. Existing content-based storage systems may utilize an array of storage device such as solid-state drives (SSDs, also known as solid-state disks) to provide high performance scale-out storage. In systems such as this, volume and physical layout metadata can offer tremendous flexibility in decoupling and virtualization. Logical volume metadata used with these systems can provide flexible mapping from logical address to data content references, also known as a hash handle. The logical volume metadata also can make snapshot and single instance storage operations highly efficient.

Within a content-based storage system, data may be organized into one or more volumes identified by respective logical unit numbers (LUNs). User applications can read/write data to/from a volume by specifying a LUN and an address (or "offset") relative to the LUN. Some content-based storage systems allow for volumes to be cloned and for the creation of volume snapshots. To reduce system resource usage, internal data structures may be shared across different volumes and/or snapshots.

Some content-based storage systems serve as data protection systems that provide data replication, by creating a copy of an organization's production site data on a secondary backup storage system, and updating the backup with changes. Data replication systems generally operate either at the application level, at the file system level, or at the data block level. Continuous data protection systems can enable an organization to roll back to specific points in time. Some continuous data protection systems use a technology referred to as "journaling," whereby a log is kept of changes made to the backup storage.

SUMMARY

This Summary is provided to introduce a selection of concepts in a simplified form, to provide a basic understanding of one or more embodiments that are further described below in the Detailed Description. This Summary is not intended to identify key features or essential features of the claimed subject matter, nor is it intended to be used to limit the scope of the claimed subject matter.

In a storage system of network, disk latency refers to the time delay between a request for data and the return of the data, and input/output (I/O) latency refers to the time to complete an I/O operation. One challenge in storage systems, especially those that provide continuous data protection is the ability to keep pace with writes (e.g., I/O's or data transactions) occurring at the production site without slowing down the production site. The overhead of journaling may require several writes at the backup site for each write at the production site. As such, when writes occur at a high rate at the production site, the backup site may not be able to finish backing up one write before the next production site write occurs.

For a storage array where multiple pages are being written to multiple disks, multiple consecutive accesses of a given disk (or portion of a disk), such as via writes or reads, may cause large queues in the disks and intermittent high disk latency and/or high I/O latency. At least some embodiments described herein provide systems, methods, and devices for selecting the order of accessing disks to help to reduce or even prevent such queuing. In addition, at least some embodiments herein have applicability many different situations where there is physical load balancing between different entry points.

In certain embodiments, a computer implemented method is provided. A storage system is configured, the storage system comprising a processor in operable communication with a storage device, the storage device responsive to input/output (I/O) requests to the storage device from one or more entities in operable communication with the storage system and providing access to a storage array comprising a plurality of disks, the array having a predetermined array access width spanning the plurality of disks. A plurality of access requests to the plurality of disks are received from a corresponding plurality of the entities, at least one entity in the plurality having a corresponding respective substantially unique identifier. A finite field is defined, the finite field corresponding to the disks and based at least in part on the array access width.

A sequence interval is computed, the sequence interval associated with the finite field, the sequence interval based at least in part on the substantially unique identifier and the array access width, wherein the sequence interval is configured to be substantially unique for the respective entity. A disk, in the plurality of disks, is selected, where the disk corresponds to a starting point for the access request. For the respective entity having the unique identifier, a respective disk access sequence is generated, the disk access sequence defining a disk access pattern for all disks in the array access width for that respective entity, wherein the sequence directs the respective entity to access at least a portion of the plurality of disks in a predetermined order, wherein the predetermined order increments from the starting point to subsequent disks in accordance with the sequence interval, such that, when the disk access sequence is complete, the respective entity has accessed each disk in the portion of the plurality of disks only a predetermined number of times. The respective entity is provided access to the storage array in accordance with the disk access sequence, wherein the access to the storage array and the disk access sequence are configured to substantially minimize how many different entities can attempt to access a given disk in the plurality of disks, at substantially the same time.

In certain embodiments, the predetermined number of times comprises one time. In certain embodiments, each of the plurality of entities further comprises its own respective substantially unique identifier and defining the sequence interval further comprises defining, for each of the plurality of entities, a respective sequence interval, each respective sequence interval derived based at least in part on the respective unique identifier and the array access width;

In certain embodiments, generating the respective disk access sequence further comprises generating respective disk access sequences for each of the plurality of entities; and providing the respective entity access to the storage array further comprises providing each of the plurality of respective entities access to the storage array in accordance with their respective disk access sequences.

In certain embodiments, the storage array comprises a RAID array. In some embodiments, the predetermined array access width comprises a stripe width. In some embodiments, the predetermined array access width comprises at least one of a prime number and a near-prime number. In additional embodiments, the sequence interval comprises a prime number. In further embodiments, the predetermined array access width is not evenly divisible by the sequence interval. In certain embodiments, a determination is made as to whether if any one or more of the plurality of disks is not available; and, the disk access sequence is adjusted to skip the one or more disks determined to be unavailable.

In another aspect, a system is provided. The system comprises a processor; and a non-volatile memory in operable communication with the processor and storing computer program code that when executed on the processor causes the processor to execute a process operable to perform the various operations. One operation is configuring a storage system comprising a processor in operable communication with a storage device, the storage device responsive to input/output (I/O) requests to the storage device from one or more entities in operable communication with the storage system and providing access to a storage array comprising a plurality of disks, the array having a predetermined array access width spanning the plurality of disks. Another operation is receiving a plurality of access requests to the plurality of disks from a corresponding plurality of the entities, at least one entity in the plurality having a corresponding respective substantially unique identifier. A further operation is defining a finite field corresponding to the disks and based at least in part on the array access width.

Still another operation comprises computing a sequence interval associated with the finite field, the sequence interval based at least in part on the substantially unique identifier and the array access width, wherein the sequence interval is configured to be substantially unique for the respective entity. A further operation comprises selecting, in the plurality of disks, a disk corresponding to a starting point for the access request. Another operation is generating, for the respective entity having the unique identifier, a respective disk access sequence defining a disk access pattern for all disks in the array access width for that respective entity, wherein the sequence directs the respective entity to access at least a portion of the plurality of disks in a predetermined order, wherein the predetermined order increments from the starting point to subsequent disks in accordance with the sequence interval, such that, when the disk access sequence is complete, the respective entity has accessed each disk in the portion of the plurality of disks only a predetermined number of times.

A still further operation comprises providing the respective entity access to the storage array in accordance with the disk access sequence, wherein the access to the storage array and the disk access sequence are configured to substantially minimize how many different entities can attempt to access a given disk in the plurality of disks, at substantially the same time.

In a further aspect, a computer program product is provided, including a non-transitory computer readable storage medium having computer program code encoded thereon that when executed on a processor of a computer causes the computer to operate a storage system. The computer program product comprises computer program code for receiving a plurality of access requests to the plurality of disks from a corresponding plurality of the entities, at least one entity in the plurality having a corresponding respective substantially unique identifier. The computer program product also comprises computer program code for defining a finite field corresponding to the disks and based at least in part on the array access width;

The computer program product also comprises computer program code for computing a sequence interval associated with the finite field, the sequence interval based at least in part on the substantially unique identifier and the array access width, wherein the sequence interval is configured to be substantially unique for the respective entity. The computer program product further comprises computer program code for selecting, in the plurality of disks, a disk corresponding to a starting point for the access request.

The computer program product also comprises computer program code for generating, for the respective entity having the unique identifier, a respective disk access sequence defining a disk access pattern for all disks in the array access width for that respective entity, wherein the sequence directs the respective entity to access at least a portion of the plurality of disks in a predetermined order, wherein the predetermined order increments from the starting point to subsequent disks in accordance with the sequence interval, such that, when the disk access sequence is complete, the respective entity has accessed each disk in the portion of the plurality of disks only a predetermined number of times; and computer program code for providing the respective entity access to the storage array in accordance with the disk access sequence, wherein the access to the storage array and the disk access sequence are configured to substantially minimize how many different entities can attempt to access a given disk in the plurality of disks, at substantially the same time.

Details relating to these and other embodiments are described more fully herein.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

Figure 2:
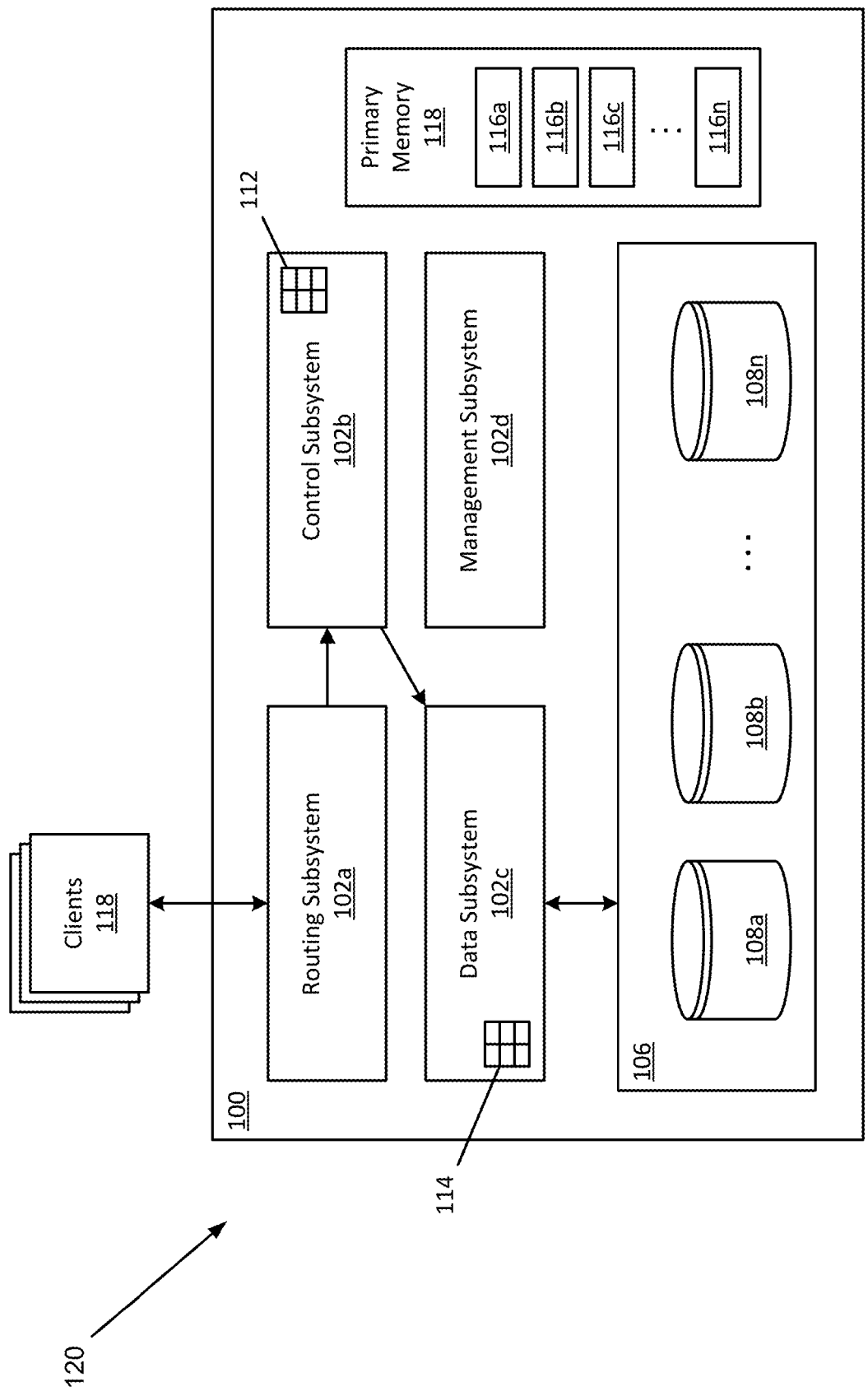
FIG. 2 is a simplified block diagram of a content-based storage system, in accordance with at least one illustrative embodiment of the disclosure.
Figure 3:
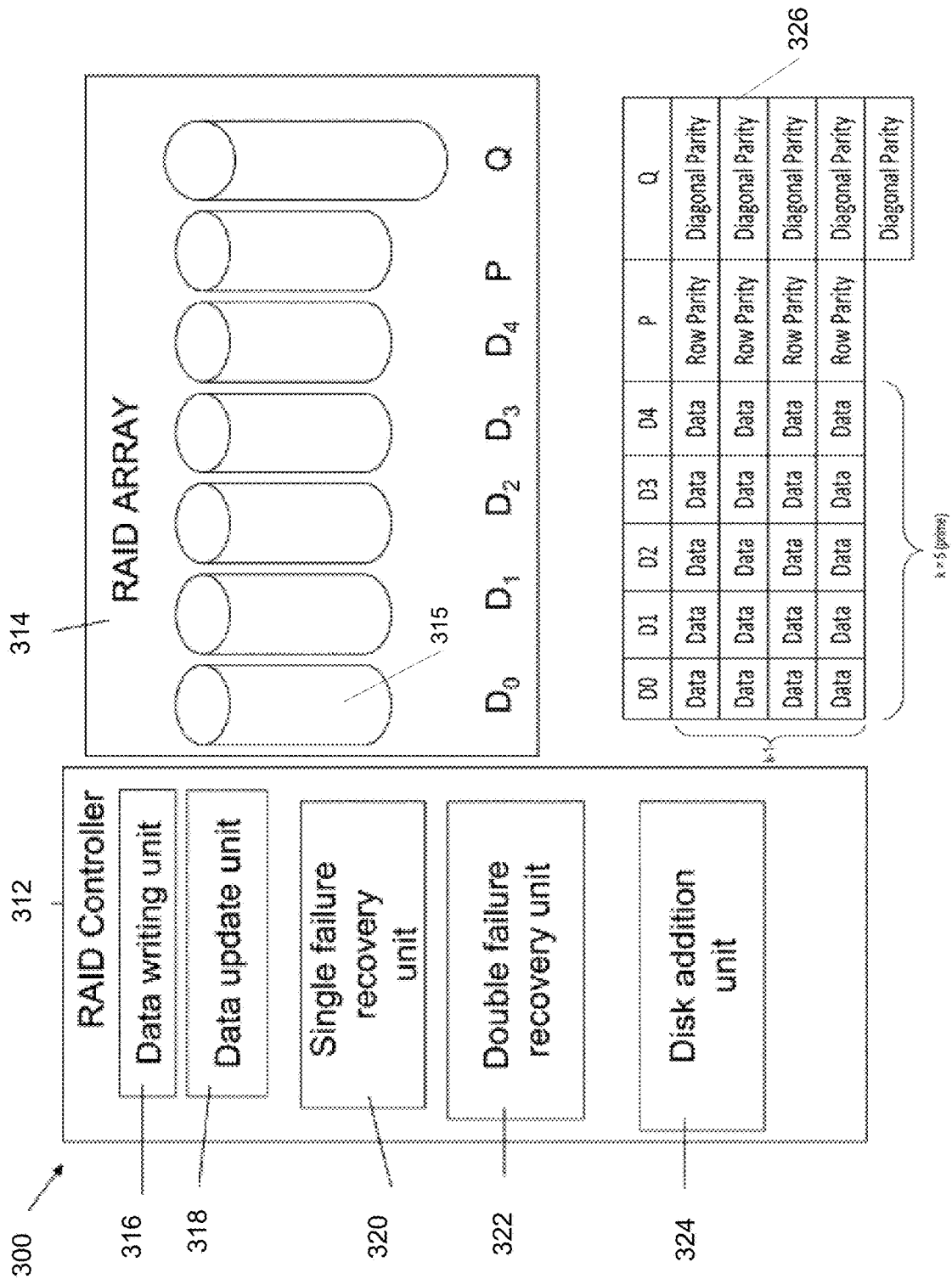
FIG. 3 is a simplified schematic diagram illustrating an exemplary RAID memory system usable with at least some embodiments described herein.
Figure 4:
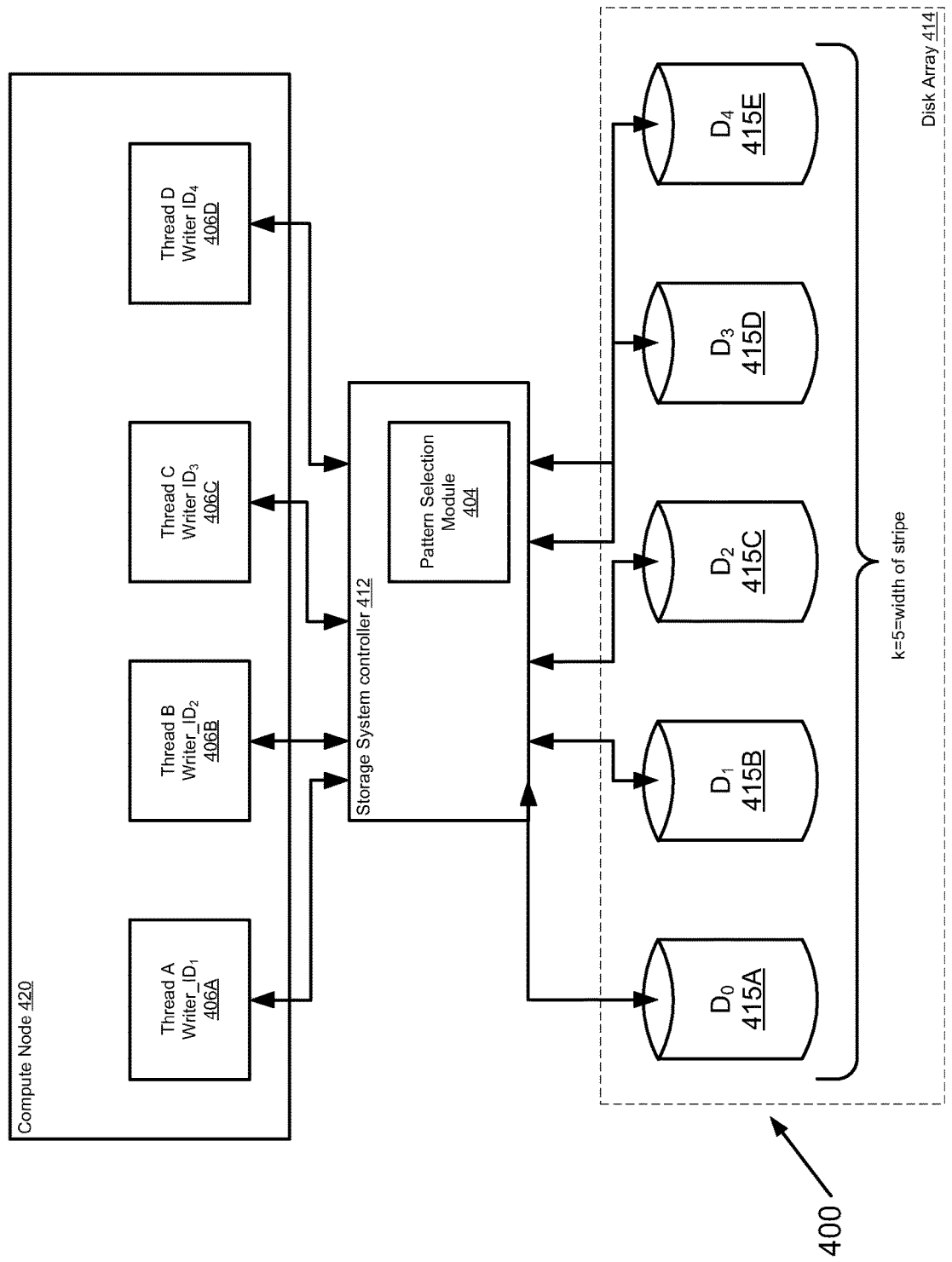
FIG. 4 is a simplified schematic diagram illustrating an exemplary system for disk access pattern selection, in accordance with at least some embodiments described herein.
Figure 5:
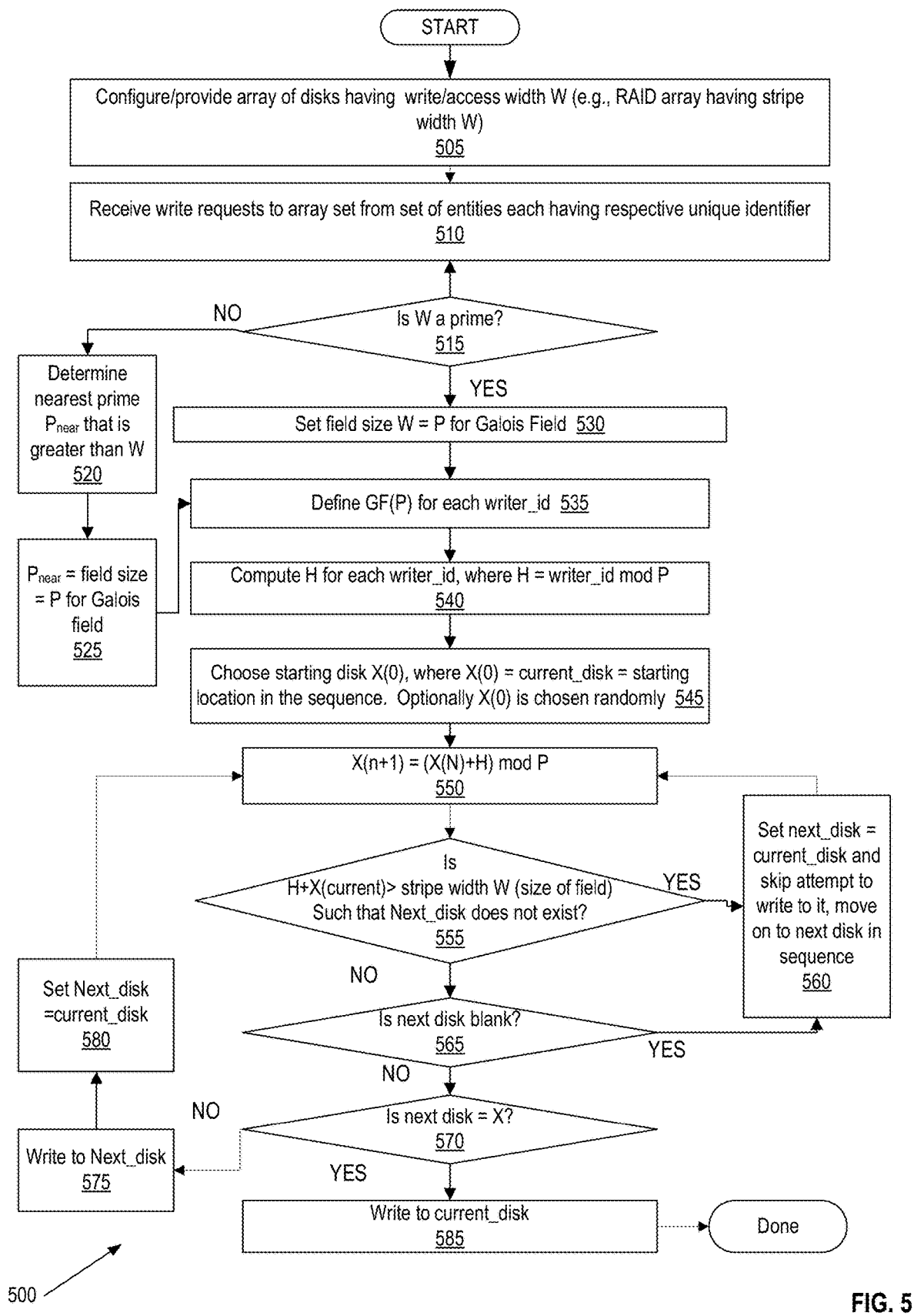
FIG. 5 is a simplified flowchart of an overall method for disk access pattern selection in accordance with at least some embodiments described herein.
Figure 7:
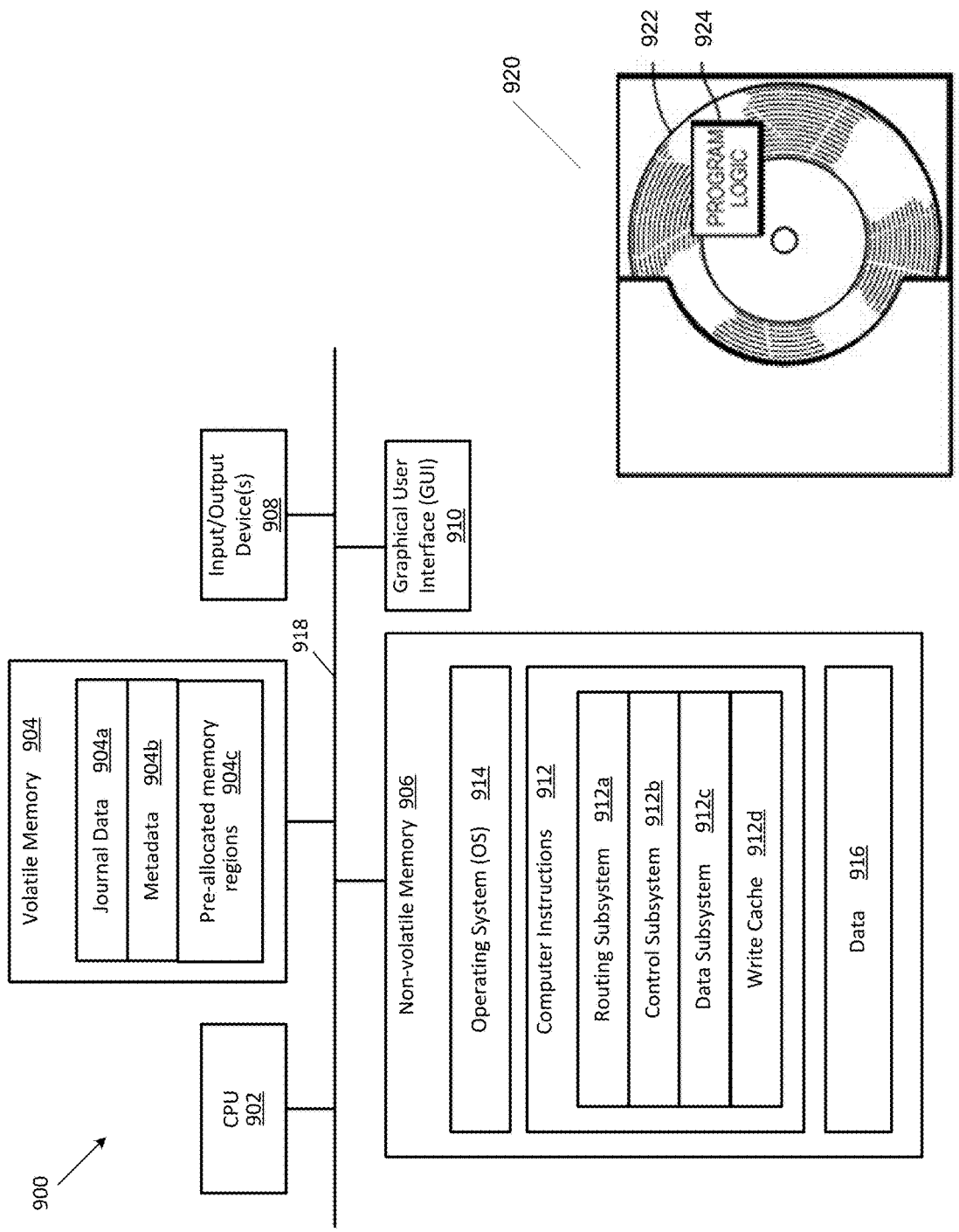

FIG. 6 is a table showing an exemplary disk access pattern in a system configured in accordance with the method of FIG. 5, using the exemplary system of FIG. 4, in accordance with at least some embodiments; and FIG. 7 is a simplified block diagram of an apparatus that may be used to implement at least a portion of the systems of FIGS. 1-4, at least a portion of the process of FIG. 5, in accordance with at least some embodiments.

DETAILED DESCRIPTION

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the terms "disk," and "storage device" may also refer to may refer to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). The term "storage array" may be used herein to refer to any collection of one or more storage devices, such as a storage array including multiple storage devices.

In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium.

In certain embodiments, the term "I/O request" or simply "I/O" may be used to refer to an input or output request, such as a data read or data write request, which can originate at a host, at a user, or at any other entity in operable communication with a computer system. As used herein, the terms "I/O read request" and "I/O read" refer to a request to read data. The terms "I/O write request" and "I/O write" refer to a request to write data. The terms "I/O request" and "I/O" refer to a request that may be either an I/O read request or an I/O write request. As used herein the term "logical I/O address" and "I/O address" refers to a logical address used by users/clients to read/write data from/to a storage system.

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, the terms LU or LUN (logical unit number) may be used interchangeably with each other. In certain embodiments, a LUN may be a logical unit number for identifying a logical unit; a LUN may also refer to one or more virtual disks or virtual LUNs, which may correspond to one or more Virtual Machines. LUNs can be divided into smaller logical areas, to balance the load between system modules, where each such small logical area is called a sub-LUN.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, an image may be a copy of a logical storage unit at a specific point in time. In certain embodiments, a clone may be a copy or clone of the image or images, and/or drive or drives of a first location at a second location. In some embodiments, a clone may be made up of a set of objects.

In certain embodiments, a segment may refer to the amount of data written to one drive in a virtual disk group before writing data to the next drive in the virtual disk group. A segment size of 128K is a reasonable starting point for most applications. In most applications, the greater the number of drives in a disk group, the better the average performance writing data to the next drive in the virtual disk group. A segment size of 128K is a reasonable starting point.

In certain embodiments, a stripe is created by a set of contiguous segments spanning across member drives. For example, in a RAID 5,4+1 virtual disk group with a segment size of 128 KB, the first 128 KB of an I/O is written to the first drive, the next 128 KB to the next drive, and so on with a total stripe size of 512 KB. For a RAID 1, 2+2 virtual disk group, 128 KB would be written to each of the two drives (and same for the mirrored drives). If the I/O size is larger than this (the number of physical disks multiplied by a 128 KB segment), this pattern repeats until the entire I/O is complete. In certain embodiments, the choice of a segment size can have a major influence on performance in both IOPS and data transfer rate.

In certain embodiments, for very large I/O requests, an optimal segment size for a RAID disk group is one that distributes a single host I/O across all data drives within a single stripe. The formula for maximal stripe size is as follows:

LUN segment size=Maximal I/O Size÷number of data drives

A LUN is a logical unit number which corresponds to a storage volume and is represented within a disk group. The LUN segment size should be rounded up to the nearest supported power of two value.

U.S. Pat. No. 8,990,495 ("Method and System for Storing Data in RAID Memory Devices"), which is hereby incorporated by reference, describes systems and methods for storing data in RAID devices.

In certain embodiments, a snapshot may refer to differential representations of an image, i.e. the snapshot may have pointers to the original volume, and may point to log volumes for changed locations. In certain embodiments, a snapshot may refer to differential representations of the state of a system. Snapshots may be combined into a snapshot array, which may represent different images over a time period or different states of a system over a time period. In certain embodiments, snapshots may be taken from the original source address range as well as from previous snapshots acting as new sources. Snapshots can be arranged into a hierarchy such as a tree, in certain embodiments, with each respective snapshot considered to be a leaf of the tree. Alternately, snapshots can be arranged into a type of tree where there is a tree per snapshot. In another alternative, snapshots can be viewed as part of an array and viewed "by row" or "by column." With arrangement by row, the snapshots are arranged so that they are part of a tree of snapshots, where each leaf of the tree corresponds to another tree of addresses in that snapshot. With arrangement by column, snapshots can be arranged such that there is a tree of addresses, where each leaf contains a tree of snapshots which contain that address.

In certain embodiments, a journal may be a record of write transactions (e.g., I/O data) issued to a storage system, which may be used to maintain a duplicate storage system, and to roll back the duplicate storage system to a previous point in time. In some embodiments, each entry in a journal contains, apart from the I/O data itself, I/O metadata that can include information such as a volume identifier (ID), the I/O block offset within the volume, the I/O length, and a time stamp of the I/O.

In certain embodiments, XtremIO, available from Dell EMC of Hopkinton, Mass.) is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random I/O data. In certain embodiments that utilize a Content Addressable Storage (CAS) array, data is stored in blocks, for example of 4 KB, where each block has a unique large hash signature, for example of 20 bytes, saved on flash memory.

In certain embodiments, an X-page is a predetermined-size aligned chunk as the base unit for memory and disk operations. In certain embodiments described in the present description, the X-Page size is referred to as having 4 KB; however other smaller or larger values can be used as well, and nothing in the design is limited to a specific value.

In certain embodiments, a logical X-page address is the logical address of an X-page, containing a LUN identifier as well as the offset of the X-page within the LUN.

It is envisioned that at least some embodiments herein are usable with one or more of the embodiments described in certain commonly owned U.S. patents and patent documents, including: U.S. Pat. No. 9,141,290 ("Snapshot Mechanism"); U.S. Pat. No. 8,990,495 ("Method and System for Storing Data in RAID Memory Devices"); U.S. Pat. No. 9,104,326 ("Scalable Block Data Storage Using Content Addressing"); U.S. Pat. No. 9,606,870 ("Data Reduction Techniques in a Flash-Based Key/Value Cluster Storage"); U.S. Pat. No. 8,478,955 ("Virtualized Consistency Group Using More Than One Data Protection Appliance"); U.S. patent application Ser. No. 15/499,297 ("Capacity Determination for Content-Based Storage"), filed Apr. 27, 2017; U.S. patent application Ser. No. 15/499,303 ("Snapshot Visualization For Content-Based Storage"), filed Apr. 27, 2017. Each of these patents, references, and/or patent documents is hereby incorporated by reference in its entirety, each of which is hereby incorporated by reference.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants are not necessarily to be construed as preferred or advantageous over other embodiments and/or to exclude the incorporation of features from other embodiments. In addition, the word "optionally" is used herein to mean that a feature or process, etc., that is provided in some embodiments and not provided in other embodiments." Any particular embodiment of the invention may include a plurality of "optional" features unless such features conflict.

Figure 1:
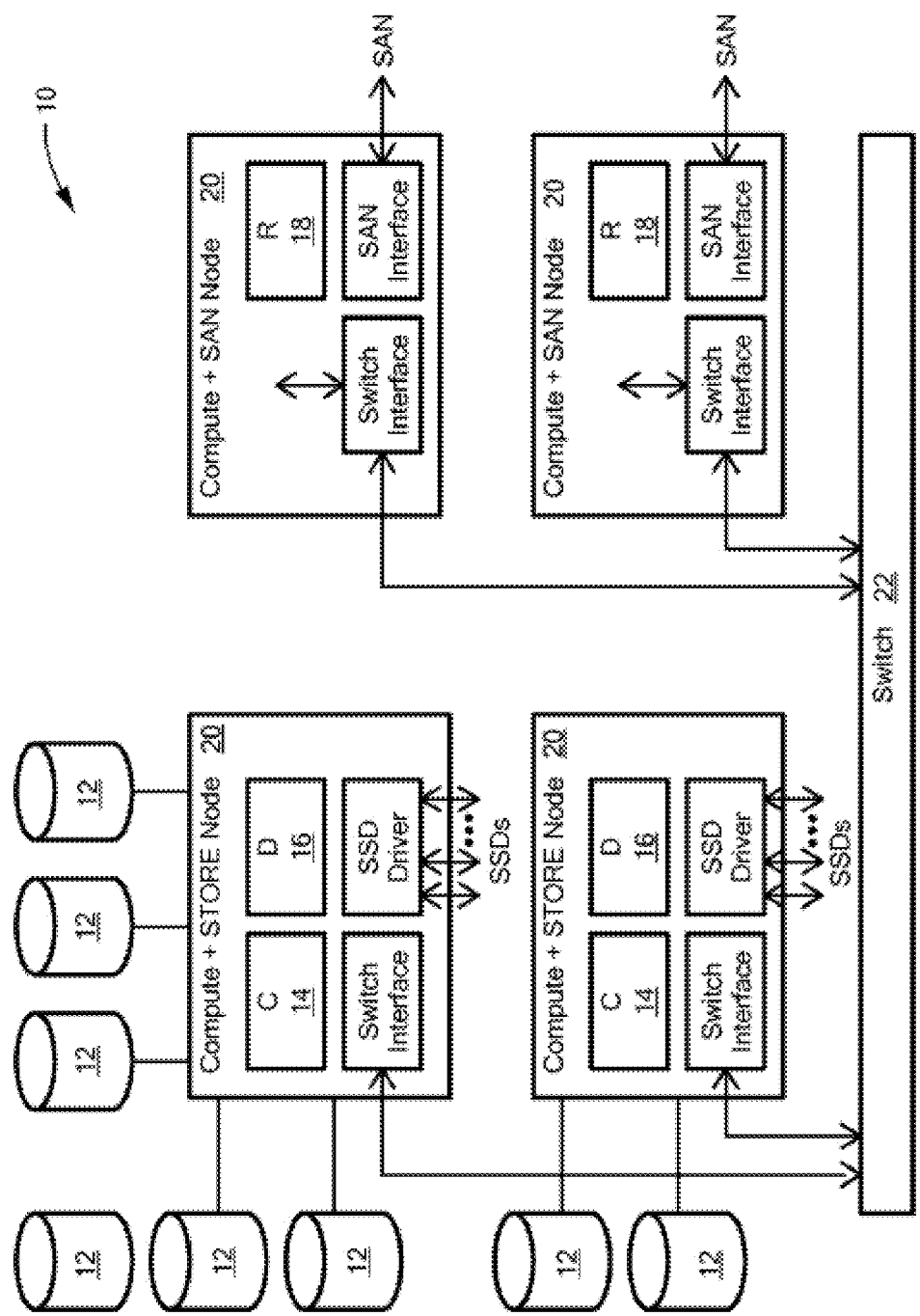
FIG. 1 is a simplified diagram schematically illustrating a distributed storage system for data storage, having separate control and data planes, in accordance with at least one illustrative embodiment of the disclosure.

Before describing certain embodiments that feature ways to implement disk access pattern selection to improve queuing, some systems in which the embodiments can be implemented are now described. For example, FIG. 1 is a simplified diagram schematically illustrating a distributed storage system for data storage, having separate control and data planes, in accordance with at least one illustrative embodiment of the disclosure; and FIG. 2 is a simplified block diagram of a content-based storage system, in accordance with at least one illustrative embodiment of the disclosure;

FIG. 1 illustrates a system 10 for scalable block data storage and retrieval using content addressing, which is usable in accordance with certain embodiments described herein. The system 10 includes a plurality of data storage devices 12 on which the data blocks are stored. The storage devices 12 are networked to computing modules, there being several kinds of modules, including control modules 14 and data modules 16. The modules carry out content addressing for storage and retrieval, and the network defines separate paths or planes, control paths or a control plane which goes via the control modules 14 and data paths or a data plane which goes via the data modules 16.

The control (C) modules 14 may control execution of read and write commands. The data (D) modules 16 are connected to the storage devices 20 and, under control of a respective control module, pass data to or from the storage devices. Both the C and D modules 14, 16, respectively, may retain extracts of the data stored in the storage device, and the extracts may be used for the content addressing. Typically the extracts may be computed by cryptographic hashing of the data, as will be discussed in greater detail below, and hash modules (H) may specifically be provided for this purpose. That is to say the hash modules calculate hash values for data which is the subject of storage commands, and the hash values calculated may later be used for retrieval.

Routing modules 18 may terminate storage and retrieval operations and distribute command parts of any operations to control modules that are explicitly selected for the operation in such a way as to retain balanced usage within the system 10. The routing modules 18 may use hash values, calculated from data associated with the operations, to select the control module for the distribution. More particularly, selection of the control module may use hash values, but typically relies on the user address and not on the content (hash). The hash value is, however, typically used for selecting the Data (D) module 16, and for setting the physical location for data storage within a D module 16.

The storage devices 12 may be solid-state random access storage devices, as opposed to spinning disk devices; however disk devices may be used instead or in addition. A deduplication feature may be provided. The routing modules 18 and/or data modules 16 may compare the extracts or hash values of write data with hash values of already stored data, and where a match is found, simply point to the matched data and avoid rewriting. The modules are combined into nodes 20 on the network, and the nodes are connected over the network by a switch 22. The use of content addressing with multiple data modules selected on the basis of the content hashing, and a finely grained mapping of user addresses to Control Modules, allows for a scalable distributed architecture.

FIG. 2 shows a storage system 100 according to an illustrative embodiment of the disclosure, which is usable with at least some embodiment described herein. The storage system 100 may be the same as or similar to a node 20 within the distributed storage system 10 of FIG. 1. The storage system 100 may include a plurality of subsystems 102a-102d (generally denoted 102 herein), a storage array 106 comprising a plurality of storage devices 108a . . . 108n (generally denoted 108 herein), and a primary memory 118. In some embodiments, the storage devices 108 may be provided as random access storage devices, such as solid-state devices (SSDs).

The primary memory 118 can be any type of memory having access times that are significantly faster compared to the storage devices 108. In some embodiments, primary memory 118 may be provided as dynamic random-access memory (DRAM). In certain embodiments, primary memory 118 may be provided as synchronous DRAM (SDRAM). In one embodiment, primary memory 118 may be provided as double data rate SDRAM (DDR SDRAM), such as DDR3 SDRAM.

In the embodiment shown, the subsystems 102 include a routing subsystem 102a, a control subsystem 102b, a data subsystem 102c, and a management subsystem 102d. In one embodiment, subsystems 102 may be provided as software components, i.e., computer program code that, when executed on a processor, may cause a computer to perform functionality described herein. In a certain embodiment, the storage system 100 includes an operating system (OS) and one or more of the subsystems 102 may be provided as user space processes executable by the OS. In other embodiments, the subsystems 102 may be provided, at least in part, as hardware, such as digital signal processor (DSP) or an application specific integrated circuit (ASIC) configured to perform functionality described herein.

The routing subsystem 102a may be configured to receive I/O operations from clients 119 using, for example, an external application-programming interface (API) and to translate client I/O operations into internal commands. In some embodiments, the routing subsystem 102a is configured to receive commands from small computer system interface (SCSI) clients 119. In certain embodiments, the system 100 may store data in fixed-size chunks, for example 4K chunks, where each chunk may have a unique hash value (referred to herein as a "chunk hash," which in certain embodiments is the same as a hash digest). In such embodiments, the routing subsystem 102a may be configured to split data into fixed-size chunks and to calculate the corresponding chunk hashes. In one embodiment, chunk hashes are calculated using Secure Hash Algorithm 1 (SHA-1) processing. In some embodiments, a chunk corresponds to a fixed number of contiguous blocks within a storage device.

The control subsystem 102b may be configured to maintain a mapping between I/O addresses associated with data and the corresponding chunk hashes. As shown in FIG. 1, this mapping may be maintained using a data structure 112, referred to herein as an "I/O address to chunk hash mapping table" or "A2H table," (also known as A→H table) according to some embodiments. In one embodiment, I/O addresses may be logical addresses used by clients 119 to access data within the storage system 100.

The data subsystem 102c may be configured to maintain a mapping between chunk hashes and physical storage addresses (i.e., storage locations within the storage array 106 and/or within individual storage devices 108). This mapping may be maintained using a data structure 114, referred to herein as a "hash to physical address mapping table" or "H2P table," or "H→P table," according to some embodiments, where this table, in certain embodiments, includes information similar to that of the aforementioned HMD (hash metadata) and PL (physical layout) tables. In certain embodiments, as described, for example, in the incorporated by reference patents, there also may be a mapping referred to as the H2D or H→D table, where D stands for disk physical layout, In certain embodiments, the H2P table is maintained to route data with different hashes to different D modules. The data subsystem 102c may be also be configured to read and write data from/to the storage array 106 (and/or to individual storage devices 108 therein).

It will be appreciated that combinations of the A2H 112 and H2P 114 tables may provide multiple levels of indirection between the logical (or "I/O") address a client 119 uses to access data and the physical address where that data is stored. Among other advantages, this can give the storage system 100 freedom to move data within the storage array 106 without affecting a client's 119 access to that data (e.g., if a storage device 108 fails).

The management subsystem 102d may be configured to monitor and track the status of various hardware and software resources within the storage system 100. In some embodiments, the management subsystem 102d may manage the allocation of memory by other subsystems (e.g., subsystems 102a-102c) using techniques described below in conjunction with FIGS. 2-6. In some embodiments, the management subsystem 102d can also be configured to monitor other subsystems 102 (e.g., subsystems 102a-102c)

and to use this information to determine when the storage system 100 may begin processing client I/O operations after a restart.

A subsystem 102 may store various types of information within primary memory 118. For example, the control subsystem 102b may store some or all of the information within the A2H table 112 in primary memory 118. Likewise, the control subsystem 102c may store some or all of the information within the H2P table 114 in primary memory 118. In some embodiments, subsystems 102 cache metadata within primary memory 118 to improve system performance. In some embodiments, a subsystem 102 may maintain a change journal to efficiently handle changes to metadata or other information. Such change journals may also be stored in primary memory 118. For example, in certain embodiments, a subsystem's dynamic memory requirements may include metadata used to process I/O operations. In other embodiments, metadata stored within a process memory space may include address-based metadata (e.g., information used within the A2H table 112 of FIG. 2) and hash-based metadata (e.g., information used within the H2P table 114 of FIG. 2). It will be appreciated that the actual amount of metadata used by a subsystem may depend on the client I/O patterns which, in general, are a priori unknown. Thus, in some embodiments, a fixed amount of memory is allocated to each subsystem for metadata and it is left to the subsystem (or its components) to utilize the memory as appropriate. In one embodiment, a subsystem 102 may require up to 128 GB of primary memory to function normally.

U.S. Pat. No. 8,990,495 (hereinafter '495 patent), which is incorporated by reference herein, describes various examples of ways to store data in RAID memory devices. FIG. 3, which is based on a combination of FIGS. 4 and 5 of the '495 patent, depicts a simplified schematic diagram illustrating an exemplary RAID 6 type of memory system that is usable with at least some embodiments described herein, though the embodiments are not limited to any particular RAID implementation, as will be appreciated. RAID provides a way to provide high levels of storage reliability by arranging drives in groups, and dividing and replicating data among the drives in a group. When a pool is created, drive types and RAID configurations (RAID types and stripe widths) are selected. Generally, in some implementations, when a pool is configured, the RAID type of a tier cannot be changed; however, in some hybrid RAID implementations, it can be possible to add a new tier with a different RAID type.

In a dynamic pool, drives are partitioned into drive extents. These extents are combined into RAID extents, which are spread across multiple drives. The number of drive extents within a RAID extent depends on the RAID type and width. For example, a RAID 5 (4+1) RAID extent contains five drive extents. For redundancy purposes, the system ensures that no RAID extent contains two drive extents from the same drive. Also, each drive extent can only be part of one RAID extent. A RAID group in a dynamic pool is a collection of RAID extents. The number and size of RAID groups in a dynamic pool can vary depending on the number of drives and how the pool was created and expanded. A RAID extent can only be part of one RAID group.

In a traditional pool, a RAID group contains sets of drives with the same capacity and redundancy on which one or more storage resources can be created. The system creates one or more RAID groups for the pool based on the specified configuration. For example, if a storage resource is created in a RAID 5 (4+1) group, data is distributed equally across the five drives in the RAID group. In this instance, if it is desired to create a pool using more than five drives, it must be done in multiples of the selected RAID stripe width.

As discussed further below, RAID usually has the characteristics of parity, striping, or both. Parity provides redundancy for blocks of data on the drives. Depending on the RAID type, this provides the ability to continue to operate with the loss of one or more drives. Striping provides a mechanism for processing data that allows the comprehensive read/write performance of a RAID group to exceed the performance of its component drives.

In particular, FIG. 3 illustrates a redundant array of independent disk (RAID) memory storage system 300 according to a first embodiment of the present invention. The memory storage system 300 comprises a controller 312 and an array 314 of data storage disks 315, in this example five data disks 315 $D_0$ through $D_4$.

The controller 312 includes a data write unit 316 for writing initial data into the array, an update unit 318 for updating existing data in the array, a single failure recovery unit 320 for recovering data after a single disk failure and a double failure recovery unit 322 for recovering data following concurrent failure of two disks. A disk addition unit 324 manages the addition of a new disk to the system, either after failure of an existing disk or when it is desired to expand the system 300. The operation of each of these units is discussed in greater detail herein below.

Each of the disks in the array 314 stores a column of data blocks. The same data block in successive disks forms a row, which is to say the rows cross the disks. The data storage blocks are stored alongside parity data blocks in parity disks p and q, and the numbers of data blocks in the different columns or disks are different. Row parity data is placed in row parity blocks in row parity column p. Diagonal parity data is placed in diagonal parity blocks in a diagonal parity column q. The stripe 326 used with the RAID system 300 shows a distribution of data blocks in the RAID 6 memory array of FIG. 3 and shows, in this particular implementation, a type of stripe arrangement where the p and q columns are used for parity (instead of being used as redundancy bits, as is done in some RAID configurations, as the '495 patent notes), so that RAID 6 can tolerate up to two disk failures. Generally, RAID has two redundancy/parity disks for every k data disks, which reaches a capacity overhead of 2/k. The '495 patent describes how blocks in such a stripe are updated and coded.

In the exemplary case of five data columns and four data rows, as shown in FIG. 3, the number of diagonals is one greater than the number of rows. Hence the diagonal parity column Q comprises one more block than the other columns. More generally, as will be discussed below, the number of data columns is a prime number (shown in FIG. 3 ask columns in the distribution of data blocks 326), and the number of rows is one less than that prime number (i.e., k−1), creating the asymmetry discussed hereinabove.

In certain embodiments, the various columns can be distributed over the physical disks available, so as reduce system bottlenecks. The array may comprise a plurality of solid-state drives (SSD) as opposed to magnetic disks. As is understood, SSDs are random access, whereas magnetic disks are mechanical devices with momentum. The magnetic disks are thus most efficient where data readout is largely serial and having uneven sizes of columns between stripes causes the magnetic disks to work inefficiently. SSDs however are solid state with no momentum issues, and thus at least some advantageous embodiments herein are implemented using an array of SSD devices, or any other random access device.

As mentioned above, the number of data columns, an exemplary RAID implementation, may equal a prime number and the number of data rows is one less than the number of data columns, to create an asymmetry that ensures that each column is absent from one of the diagonals. In certain embodiments, the number of data columns is equal to a number of disks allowed in the array—which is the prime number k referred to above. At any given time an actual number of disks present is less than or equal to the allowed number of disks, so that new disks can be added until that allowed number is reached. When a disk is added, data parity blocks need to be added to the new disk to keep the parity blocks, the p and q columns, evenly spread over the physical disks to help to reduce system bottlenecks. Hence the controller 312 comprises a disk addition unit 324 to manage the process of adding a disk to the array. To add a new disk to the array and maintain a balance of parity blocks over the array, the disk addition unit 324 migrates a row parity block to the new disk.

However, in an embodiment, instead of actually writing data on the new disk, the unit in fact retains the row parity blocks at their original disk position and defines a zeroed block of data in the new disk to receive future parity updates for the selected row parity block. Because the original parity block is retained, zero is the current correct parity for the row, so that only updates from now onwards are needed and a resource consuming read and write is avoided. The disk addition unit 324 copies a single diagonal parity block to the new disk since the addition of a new disk means there is a single old diagonal parity block that does not reside in the new diagonal parity group. The rest of the diagonal parity blocks are defined as zeroed blocks of data in an identical manner to the case described above for row parity blocks, because they can be placed in positions such that they are in the same parity groups as the old diagonal parity blocks.

In certain embodiments, the controller 312 comprises a single-disk-failure recovery unit 320. A basic embodiment recovers the data of the entire disk using row parity only or diagonal parity only. However a more efficient embodiment uses row parity to recover just some, typically half, of the lost data blocks and then switches to diagonal parity to recover the remaining data blocks. The switch to diagonal parity means that data blocks already read to recover row parity data can be reused and thus the entire disk can be recovered with considerably fewer read operations.

A double-disk-failure recovery unit 322 can be used to recover data following failure of two of the disks. Briefly the unit selects a first block for recovery from one of the disks, where the block's diagonal parity includes that block but does not include any blocks from the other missing column. The unit recovers this first block using the diagonal parity. The unit then recovers the block of the same row in the second missing disk using the row parity. The unit continues to alternate between diagonal and row parity until all the rows are recovered.

The data update unit 318 writes a new data block over an old data block. The data update unit 318 reads the old data block, and existing parity data, then writes the new data block and XORs data of the old data block with data of the new data block and the existing parity data to form new parity data. There is no need to read the other data blocks in the same row or column since they remain unchanged, meaning their parity remains unchanged.

In certain embodiments, system overhead is reduced at the expense of capacity. A block is added to contain the parity of the $k^{th}$ diagonal, which can lead to the disadvantage of having columns which are different sizes, and thus disks which are different sizes. In fact the different sized disk problem can be avoided if the blocks are spread over different disks in such a way as to provide no noticeable difference. Spreading over different disks has the added advantage of helping to reduce bottleneck creation, as discussed with the existing schemes.

As discussed above, a RAID 6 scheme based on magnetic disks requires sequential disk actions and the absence of an even disk layout means that the tendency of disk actions to be sequential is lost. However when working with SSDs (Solid State Drives) which are much more random access, data access can be in any desired sequence without any issue of mechanical inertia. An SSD is a data storage device that uses solid-state memory to store persistent data with the intention of providing access in the same manner of a traditional block I/O hard disk drive. SSDs are distinguished from traditional hard disk drives (HDDs), which are electromechanical devices containing spinning disks and movable read/write heads. In contrast, SSDs use microchips which retain data in non-volatile memory chips and contain no moving parts. Compared to electromechanical HDDs, SSDs are typically less susceptible to physical shock, are silent, have lower access time and latency, but are many times more expensive per gigabyte (GB). SSDs use the same interface as hard disk drives, thus easily replacing them in most applications.

At present, SSDs use NAND-based flash memory, which retains memory even without power. SSDs using volatile random-access memory (RAM) also exist for situations which require even faster access, but do not necessarily need data persistence after power loss, or use external power or batteries to maintain the data after power is removed. Certain embodiments can also require more space for redundancy than the previously outlined RAID 6 schemes. However as k gets larger, the additional overhead gets smaller so that this particular disadvantage is manageable. In particular k advantageously must be at least as large as the number of disks, but it can be larger as well, and even considerably larger, in order to help to reduce the overhead.

Consider a storage array that consists of a cluster of compute nodes, where each node is responsible for a portion of the compute power and for the flash drives in the system (e.g., RAID drives implemented using flash). Further, consider a back-end service that constitutes a key/value service where the key uniquely identifies values. Values can be small blocks of data, for example 16 KB pages, and keys are much smaller, for example a few bytes. The key/value service is providing data blocks that need to be written to a set of disks, in a certain order, by the one or more compute nodes. Generally, the data blocks are being written to a set of disks in a certain order. Furthermore, assume that when multiple pages are being written to multiple disks the order of writes does not affect data integrity, whereas having multiple consecutive writes may cause large queues in disks and intermittent high disk latency.

For example, the compute nodes, or multiple threads within a compute node, may all be trying to write to the same disk at the same time. Possibly all the threads of the system are trying to write to disk 1, they wait on it, and then one of them finishes and progresses to disk 2, then all the rest finish, and while this is finishing the others move on to the second and the third disks, etc., such that there is one disk that is very active in a particular short time period, while the others are relatively less active, and the compute nodes and/or threads attempting to write (e.g., "writers") are all queued at one disk waiting for the first write to the first disk to be completed. This can create one type of "traffic jam" or queue. Even if all of the writers are not starting at the same starting place (e.g., some starting writes at D0, some starting at D3, etc., in a field of, for example, disks $D_0$, $D_1$, $D_2$, $D_3$, $D_4$), such traffic queues may still occur because one thread might progress too quickly with its cycles of rights and may catch up very quickly to other writers writing at different locations.

Various approaches to address this issue have been attempted. For example, a common approach is to read and write using a FOR loop (starting from 0 to n disks). One issue with such an approach is that even though the requests (to write) are received at different times by writers they hit very quickly the same i (indexed address in memory). For example, assume that there are ten writers that start from 0 at different times (times $T_0$ through $T_9$), where the writer can be any type of entity capable of writing to disk, such as compute node, a thread, a process, etc. If one of the writers catches up to another, for example writer 7 is a little quicker than writer 8 and both writer 7 and writer 8 access disk 8, all the other writers potentially could get stuck behind them too, since they are competing for resources of disk 8. And while writer 7 and writer 8 are attempting to access disk 8, writer 6 catches up, and so forth. In this example, the arrangement can result in multiple writers accessing the same disk and would cause high latency.

An improvement on the above described FOR loop scheme is to use a random function to generate the next disk. One issue with this approach is deciding how the random number is to be generated, because a number of different algorithms can be used. In a lot of cases, if the arrangement shares the same algorithm for each writer (e.g., for each thread), the algorithm may end up generating fairly similar numbers, which means some of the writers may be attempting to write to the same disk again anyway. Another more problematic issue is that generating random numbers could be a bit more expensive and very unpredictable, because the numbers that are generated are unknown and, often are truly random. In some cases, the numbers can be so random as to be inapplicable to a given system and must be discarded (e.g., if the random number generated is larger than the number of disks or indexes that can be written. That is a downside of using a completely random number, especially when you ask Linux or the operating system for a random number, Linux will give you a truly random number; it won't give you a random number between the number ranges of the disks that a system has. It is a pretty common problem to decide the next disk to be accessed (e.g., for a read or write) in any storage system, and if a random number needs to be generated to determine the location of every single disk access, that random number generation can potentially consume a lot of CPU resources.

Another issue with the random number approach, however, is that it is necessary to keep track of the disks that have been read, because a random number generator may generate the same number twice. Another issue is that, for final numbers, the arrangement might have to "spin" (keep generating new random numbers) for a long time until it reaches a disk that has not been used. This alternative, therefore, can be cumbersome to implement and wasteful in CPU cycles.

To help address at least some of the issues of queuing during disk access, described herein are disk access pattern selection techniques, presented in accordance with systems, methods, and devices, that may be used in a many different environments, including at least to improve disk access in a storage system environment, such as in a storage system that uses a flash-based key/value cluster storage array. As noted above, in other attempted solutions to the problem of latency and queuing, using a random function can more CPU intensive, and using the disks in a certain order (such as described in the FOR loop above) can be ineffective, because even though the load is equal in the long run, in the short run the disks are overwhelmed.

In addition, in certain embodiments, the techniques described herein also can help to reduce a central processor unit (CPU) burden associated with activities such as intermittent I/O bursts to disks.

At least some embodiments described herein provide an easy and lightweight method of selecting the order of accessing the disks in order to prevent and/or reduce at least some of such queuing and latency described above. In some embodiments, techniques described herein have yielded successful results and lowered queuing on disks significantly. In certain embodiments, it has been found that at least some of the methods described herein provide a very easy and CPU effective method for lowering intermittent I/O bursts to disks.

First, FIG. 4 is a simplified schematic diagram illustrating an exemplary system 400 for disk access pattern selection, in accordance with at least some embodiments described herein, which includes one of such compute nodes 20 of FIG. 3. The system 400 can be used to implement the above-described Galois field inspired disk access pattern selection technique, as described further below. The system 400 could be part of a storage system, or any other type of system, which is in operable communication with one or more of the components shown in FIG. 4. The system 400 includes at least one compute node 420 (which can be, for example a host computer), in operable communication with a storage system controller 412 (for simplicity, interfaces between the compute node 420 and the storage system controller 412 are not shown in this Figure). Throughout this written description, the terms "coupled" and "operably coupled" shall be understood to include direct connections and indirect connections through one or more intermediary devices or components, whether such intermediary devices or components are depicted or not.

Compute node 420 may be any type of apparatus having a processor coupled to a memory (not shown) for retrieving data and for executing instructions stored in the memory, where these instructions may include instructions used to perform I/O (Input/Output) commands or operations with respect to one or more of the disk drives 412A-412E in the array 414 of disk drives 415A-415E (which can, in certain embodiments, be a RAID array). FIG. 7, described further herein, is a simplified block diagram of an apparatus that may be used to implement at least a portion of the systems and methods described in connection with FIGS. 1-6, including to implement some or all of the system 400 (including but not limited to one or more of the compute node 420, the storage system controller 412, and the pattern selection module 404), and to implement at least a portion of the process of FIG. 5, in accordance with at least some embodiments.

Storage system controller 412 can be, in certain embodiments, a disk array controller, including but not limited to a RAID controller, configured for controlling I/O commands with respect to one or more of the disk drives 415A-415E in the array 414 of disk drives 415. Controller 412 is communicatively coupled across interface (not shown) to an array 414 of disk drives 415A-415e. Disk drives 415A-415E in the array 414 of disk drives 415A-415C, in certain embodiments, can include one or more of solid-state disks, magnetic disks, optical disks, non-volatile electronic storage elements, or any other storage technology now known or someday developed. The storage system controller 412 can include various components not shown but well understood in the art, including a processor and memory, used to help execute instructions stored in memory, fetch data stored in memory, execute comments, run I/O operations to the array 414, etc.

The pattern selection module 404 is an element which can be implemented in hardware, software, firmware, or any combination thereof, e.g., by creating a programmable logic functionality configured to implement the pattern selection processes described herein. Any or all of the functionality of the pattern selection module 404 (or any other module described herein) can be implemented using one or more of the compute node 420, the storage system controller 402, the array 414, and/or the drives 415. In addition, it will be appreciated that any one or more of the devices shown in FIG. 4 can be located remotely or provided as part of a cloud computing arrangement.

Certain embodiments described herein are operable in systems such as the system 400 of FIG. 4, to help to provide a way to generate a pseudo-random sequence of disks so that each active writer (or other disk accessor) has a different sequence of disks that it is accessing, but the disk order of writes is substantially predictable, and yields each disk only once.

In certain embodiments, this is accomplished in part by taking advantage of some features of some types of arrays, and applying processes based on finite fields, to produce ways to access disks in a manner that reduces queuing. For example, the stripe width in a RAID system, in at last some implementations, is often a prime number (e.g., the stripe width in the EMC DELL XTREMIO RAID system, e.g., as shown in FIG. 3, is a prime number). However, even if the stripe size is not a prime, it is possible to find a close number P that is in fact a prime. Thus, to help to find a solution to this issue, it is possible to look at a finite field, such as a Galois Field GF(P).

As is known, in mathematics, a finite field or Galois field is a field that contains a finite number of elements. In particular, the elements of Galois Field $GF(p^n)$ is defined as $$GF(p^n) = (0,1,2,\ldots,p-1) \cup$$

$$(p, p+1, p+2, \ldots, p+p-1) \cup$$

$$(p^2, p^2+1, p^2+2, \ldots, p^2+p-1) \cup \ldots \cup$$

$$(p^{n-1}, p^{n-1}+1, p^{n-1}+2, \ldots, p^{n-1}+p-1) \quad (1)$$

where $p \in P$ and $n \in Z+$. The order of the field is given by $p^n$ while p is called the characteristic of the field. Note that the degree of polynomial of each element is at most n−1. For example, for P=5, GF(5)=(0, 1, 2, 3, 4) which consists of 5 elements where each of them is a polynomial of degree 0 (a constant).

Galois fields have found application in various areas, including cryptography, but to date have not been used to address problem of selecting patterns for access to a set of resources, to reduce queuing time for access to the resources. In one example application herein, it has been found that Galois Fields can be adapted and applied to improve access to an array of disks, such as an array of disks in a content based storage RAID system.

Consider that, in an exemplary array of disks, such as a RAID system (e.g., a system similar to that of FIG. 3), the arrangement of disks can be considered to be a finite field of elements. As with any field, a finite field is a set on which the operations of multiplication, addition, subtraction, and division are defined and satisfy certain basic rules. The most common examples of finite fields are given by the integers mod P when P is a prime number (integers mod P also can be written as integers % P).

In certain embodiments, a finite field can have a so-called primitive element, which corresponds to a number that, when multiplied by itself, can generate every element in the field (that is, every member in the field does not have to be a generator of the field, if the field itself is cyclic). As is known, the number of primitive elements in a finite field GF(q) is $\varphi(q-1)$, where $\varphi$ is Euler's totient function, which counts the number of elements less than or equal to m which are relatively prime to m. As will be described below, at least some embodiment provide a cyclic field, where there exists a primitive element that can generate every element in a field, where operations on the field can be applied to solve issues that can relate to disk access pattern selection and other applications that can involve load balancing between multiple entry points.

Thus, s means, in certain embodiments, that given that for every H and from every start point X (where X corresponds to one of elements in the field that a sequence could be started from), the sequence X(N+1)=(X(N)+H) will yield every member of the field exactly once until the sequence returns to the original starting point X. This means that a given entity that needs to be able to write to a plurality of disks (though the writes can occur in any order) can have a sequence created for it that ensures that it will be directed only once to write to a given disk for a particular write (e.g., when writing data in a stripe across several arrays in a RAID disk array), and which can avoid multiple consecutive writes to the same disk at the same time. This also means that for other entities attempting to write to the same arrays at the same time (whether to the same index locations or not), each of the other entities likewise can have its own sequence of writes that will be substantially unique to that writer and which can, as much as possible, avoid coalesced access to the same exact disk at the same time as other writers.

It is not required in all embodiments for all coalesced access to be eliminated (that is, it is allowable, in certain embodiments, for certain writers in a plurality of writers to attempt to the access the same disk at the same time as certain other writers in the plurality of writers), because, advantageously most of the other writers will not also be attempting to access that same disk during that same write cycle. Further, it is very likely that even if, say, two or three out of some prime number of writers in a field (e.g., 11 writers) are attempting to access the same disk at the same time, it is unlikely that this same two or three writers is going to move in lockstep all to the same next disk at the same time. This is illustrated further herein in connection with the discussion of FIG. 6). As will be explained further below, in certain embodiments, each writer attempting to access the field will have its own unique identifier and thus, within that field, its own unique "hop" (which is based at least in part on the unique identifier). Thus, each writer will have its own sequence, and it is unlikely that any other writers will have the same sequence. And each writer will have a sequence that does not repeat during the entire set of hops over the Galois field of disks to access.

Further, by having each writer begin at a respective random disk location within its own sequence (i.e., a random starting point X for each writer, where X is simply one location in the sequence for that writer), this can further reduce the chances of coalesced disk access by large groups of writers and can further reduce latency of disk access for at least these writers. Advantageously, in certain embodiments implemented using RAID, each writer has its own substantially unique (e.g., unique within a domain) identifier and is configured to write in a sequence that has it only attempting to write to the disks in the array once each, as the writer completes its writing of a data stripe. If another writer also wants to write to the same array of RAID disks at the same time, the other writer will be writing in a different sequence, because the other writer has its own unique identifier, which results in its own pattern of hops, as illustrated further herein in connection with FIG. 6.

As a first simplified example, assume a field P, where P=5, consisting of five elements (e.g., the five elements data disks $D_0$, $D_1$, $D_2$, $D_3$, $D_4$ of FIG. 3) and assume also that there is a plurality of entities (e.g., compute nodes, threads, processors, remote clients, etc.) that each want access to the each of the elements of the field P, where each entity needing access does not have to have access in any particular order or at any particular time, so long as the entity gets the access to each and every element. For purposes of this example only, assume that each entity is attempting to write data to each of a plurality of disks in an array (though this is not limited to only writing but is applicable to any disk access), and each entity is associated with a respective entity wanting disk access. In this example, assume that the entities are attempting to write data to a stripe in a RAID system, and thus need access to each disk in the RAID array, as will be understood in the art. It should be understood that the entities need not be unique and distinct computer systems, but could in fact be processes or threads all running within a single compute node, e.g., as shown in FIG. 4 herein. It also should be understood that the entities needing access need not all be attempting to write to the same location at "exactly" the same time; attempting to write at substantially close periods of time can result in similar bottlenecks.

In addition, further assume for this example that each respective entity has a substantially unique identifier, which can be any uniquely identifiable property about the entity needing the access to the disks (e.g., to write the data, to read data, etc.). By "substantially unique," it is meant that the identifier needs to be "unique enough" to differentiate the entity that is accessing from the other entities that also could or will access, e.g., unique within a domain. For example, in one embodiment, within a given domain or system of entities that want to write or otherwise access to one or more of the data disks, the unique identifier could be termed "writer_id", e.g., writer_1, writer_2, writer_3, etc. In another embodiment, each entity that wants access to the disks could be assigned a respective random number, which ensures that each entity is associated with a unique identifier.

The unique identifier for the entity that wants access, however it is assigned or created, is used to help generate the H (the hop) that is used to determine the "hop" that navigates around the field of disks being accessed, and helps to generate, for each writer, a substantially unique sequence or pattern of disk access. In certain embodiments, the unique identifier also helps to generate X(0) (i.e., using X(N+1)=(X(N)+H) mod P, as noted above). In certain embodiments, H=(unique identifier) mod P, e.g., H=writer_id mod P. Because the identifier (e.g., writer_id) is substantially unique (meaning, at least unique within a specific area or domain), then the resulting writer_id mod P=H will be unique. Advantageously, this will result in a unique sequence of access to a field of disks (e.g., writing to a field of disks) for each writer. And if the size P of the field is prime, for a given entity requesting access, there will not be any repetition in any given sequence until a full cycle is completed (i.e., all the possible disks in the sequence have been accessed). This helps, as well, to ensure efficiency in writes to disks by writers, because the sequence helps to ensure that a disk will be the subject of a "hop" to be written to, only once in a writer's respective sequence.

Thus, in an example of an array with five disks, $D_0$-$D_4$, the field elements being accessed in this example are:

$$F=\{D_0,D_0,D_2,D_3,D_4\} \quad (2)$$

where each respective D corresponds to a disk in an array (e.g., a RAID array), but could correspond to any type of distinct service or feature that is attempting to be accessed by multiple entities (it could even be extended to very disparate applications and industries, particularly those that require good load balancing between multiple entry points, such as air traffic control, transit schedules, traffic calming, etc.). The level of H (the hop or "increment" or "sequence interval" taken during the sequence) can be expressed, in terms of the Galois field, as:

$$H=\text{writer\_id } \% \ P=(\text{writer\_id mod } P) \quad (3)$$

So, in certain embodiments, the sequence of the disks the process would select, to move to the next disk to write to (i.e., to "hop" or "jump" to the next write in the sequence) can be referred to as a disk access pattern and can be expressed as:

$$\text{Next\_Disk}=(\text{Cur\_Disk}+H) \ \% \ P \quad (4a)$$

or $$X(N+1)=(X(N)+H)\text{MOD } P \quad (4b)$$

where X, initially, is the starting point chosen for a given sequence, H is the hop, P is the size of the field, and the field is cyclic.

In certain embodiments, the use of the unique identifier to create H and to create the Next_Disk sequence, results in generation of a completely different access sequence for each writer (i.e., each unique identifier, e.g., unique writer_id), with no repetition of access within the sequence itself, because, in certain embodiments, H will be different for each unique entity seeking access for several reasons, including (a) because H is derived from the substantially unique identifier associated with the entity seeking access); and (b) the nature of how the Galois Field works is that every next non-random number in the sequence will be different from every other one, until the entire sequence or cycle or loop is completed, and the starting point is reached.

Advantageously, in certain embodiments, H is also a prime (or near prime) that is itself not divisible by the field size P. For example, in certain embodiments, the field size P could be larger than a given set of N RAID disks. Consider an exemplary embodiment where N=25 disks (thus, N is not a prime). It is possible to choose 29 as the closest prime that is greater than N, and then all operations are performed "mod 29." Then for disks 25-28 (which are not real and do not exist in the system of N=25 disks), the process simply skips to the next disk location in the sequence (e.g., skips by the amount of the hop). Thus, in certain embodiments, the size of the field has to be a prime (P), and the size of H (the step/hop between disks in the sequence) advantageously should be a number between 1 and (P−1) (one less than the size of the field, and not evenly divisible by the field).

In certain embodiments, this helps to make the probability of coalesced access (i.e., attempts by two different entities to access the same disk at the same time) by different entities (e.g., writers) very low and will generate, within the sequence, an access to each disk only once until the sequence returns to the original starting disk access location.

In the sequence, if any disks are missing from the field (e.g., corresponding to disks in an array that are out of service or removed or under repair), the sequence can, in certain embodiments, skip over the "Next_Disk" location in the sequence and move on to another disk location. Similarly, if the sequence is implemented using a prime P larger than actual stripe width, the sequence can be configured to skip over unused locations/pages. After P such iterations, the sequence, for a given entity requesting access, will have passed every disk and returned to the start point. The same approach could also be taken by entities doing reads of a disk in case the entities have more than one page to read, as will be appreciated. Each entity completes its own sequence that has, advantageously, no repetition and is, as much as possible distinct and unique from the other sequences.

Referring again to FIG. 4, the system 400 of FIG. 4 can be configured to implement the aforementioned improvements in disk access pattern selection via the method shown in FIG. 5, which is a simplified flowchart of an overall method 500 for disk access pattern selection in accordance with at least some embodiments described herein. In this example, although the flowchart is written to show the example of writes to disk, one of skill in the art will appreciate that it likewise is applicable to any type of disk access, including, for example, disk reads that involve looking at more than one location/index.

Referring to FIG. 5, initially, an array (e.g., a RAID array) having a write width W is configured. In this example, which is not limiting, the array is a RAID disk set having stripe width W (block 505). Write requests (which also could be any other type of IO requests) are received from a plurality or set of entities each having a respective substantially unique identifier (block 510). For example, in some embodiments, requests may be received to write to a RAID array from a plurality of threads each having a respective substantially unique writer_id, e.g., writer_1, writer_2 . . . writer_n (block 510).

If the write width W is not a prime number (block 515), the nearest prime number $P_{near}$ that is also greater than W is found (block 520) and $P_{near}$ is used as size of the finite (Galois) field, hence $P_{near}$=P (block 525), and processing moves to block 535 (described below) to define the Galois Field (GF(P)) for each unique identifier associated with the one or more disk access requests of block 510. Else, if the write width W is a prime number (block 515), then the finite field size P can be set to W (block 530).

For each entity seeking access and having a substantially unique writer_id, a corresponding Galois Field GF(P) is defined (block 535 for each respective substantially unique writer_id. An H is computed for each writer_id, where H=writer_id mod P (block 540). The H represents the incrementing in the sequence (the "hops" between the sequence of disks in the array to be written to).

A starting point X is selected (block 545), where X will be the first location accessed (e.g., written to) for a given entity (e.g., a writer_id). In certain embodiments, X, the starting point, could be a random number. Generally, in some embodiments, X will be one of the elements of the field F above (equation 2). X is set as the current disk (cur_disk). H will not be a number divisible by the size of the field F. Advantageously, H could be any number between 0 and P−1, where P is the prime number that is the size of the field. Because the greatest common divisor between H and P is always 1 (since P is a prime), there will be, a full cycle, in accordance with equations 4a and 4b, above (block 550).

The current disk in equation 4a is merely a reference point (or, as applicable, a starting point) from which the sequence can start to "hop," by a size H, to move on to the next disk in the sequence to access. In some embodiments, the starting point X can be immediately written to (which is not shown in the embodiment of FIG. 5), or, in some other embodiments, as shown in FIG. 5 can be written to at the end of the process, so long as it is just written to the single time. In embodiments where each writer is starting from the same starting point X, but incrementing by its own unique respective hop "H," it can be advantageous to minimize queuing at the starting point. Referring again to FIG. 5, the next disk is pointed to (block 550), where next_disk=(current disk+H) mod P (also referred to as X(n+1)=(X(N0+H) mod P.

Checks are made in blocks 555-570, before any writes occur. The order of these checks is illustrative and not limiting; they can be done in any desired order. A check can be made to see if the next_disk, in fact exists (block 555), which is a condition that can occur if the hop size H plus X(current) is larger than the size P of the field, as noted above. That means that the hop H is incrementing the current disk (for writing) to a location that does not exist. If that is the case, or if the next disk is blank (block 565), the process skips over that disk location and instead moves on to the next possible disk (block 560). If the next disk is the starting point X (block 570), that means that the rest of the sequence has been completed, and the starting point can be written to, to complete the cycle (block 585). Else, the existing Next_disk location is written to (block 575) and then the Next_disk is reset to be the current_disk (block 480), so that the sequence can move on to complete writing to all the disks.

As an example of how unique sequences can be generated and work for a field P, consider FIG. 6, which is a table showing an exemplary set of disk access patterns in a system configured in accordance with the method of FIG. 5, using the exemplary system of FIG. 4, in accordance with at least some embodiments. Referring to FIGS. 4-6, assume:

$$\text{Field}=F=\{D_0,D_1,D_2,D_3,D_4,D_5,D_6,D_7,D_8,D_9,D_{10}\} \text{ so } P=11 \qquad (5)$$

Next, assume a plurality of writers: writer_A, writer_B, writer_C, writer_D, writer_E, writer_F, writer_G, writer_H, writer_I, and writer_J. In this example, the number of writers is smaller than the field size, but that is not required. Assume, for example, writer_A has a "unique identifier" of 1, so this translates for this "unique" writer_1 unique id=to be 1 mod 11=1, so that is the hop H. Similarly, for the rest of the writers, assume that for each respective substantially unique identifier for the corresponding writer in FIG. 6, there is a corresponding Hop H. Each writer in FIG. 6 has a random starting location X, which in certain embodiments corresponds to a random point within a given sequence of disks that the respective writer is to access.

Consider, for example, writer_C in FIG. 6, which has, based on its unique identifier, a hop H size of 3 (this computation is exemplary and not limiting). Assume a random starting point for accessing a disk for writer_C of disk 1, for the hop of size 3. Note also, however, that writer_G in FIG. 6 also has the same starting point of disk 1, although its respective hop H is 7. Even though these two writers are (randomly) starting from the same point, it can be seen that each respective writer has only that one point of coalescence with the other writer starting at the same point, because they travel through their sequences using different sized H. Similarly, for the other writers in FIG. 6, it is unlikely that a given writer is going to have many points of coalescing (meaning, for the purposes herein, points where two entities are attempting to access the same location) in any given cycle. FIG. 6 illustrates, for example, one coalescence point 610, during the first write cycle, where writer_A, writer_C, and writer D all write to disk 4 at the same time. However, in the following cycle ($2^{nd}$ cycle), it can be seen that writer_A, writer_C, and writer_D each move on to a different disk from each other and do not create a queue. As FIG. 6 illustrates, each writer has its own unique sequence of disk accesses, because each writer has its own Hop H, based on each writer's respective substantially unique identifier. For example, writer_F has a hop of H and starts at disk 10 and has this sequence of writes:

$$D10 \rightarrow D5 \rightarrow D0 \rightarrow D6 \rightarrow D1 \rightarrow D7 \rightarrow D2 \rightarrow D8 \rightarrow D3 \rightarrow D9 \rightarrow D4 \rightarrow D10 \, (6)$$

As the above shows, the cycle of writes to all of disks D0-D10 is complete after exactly P hops (in this example, 11 hops) from the starting point of D10, to likewise end at D10. That is, the number of steps taken to get back to the starting point is always the same as the size of the (finite) field (i.e., P), which is efficient. Because of the nature of the Galois field, the method of FIG. 5 automatically can detect easily when all disks have been written to (e.g., when the writer is back at starting point X), so there is no need to keep track of which disks an external random number generator has said to write to.

As one of skill in the art will appreciate, these advantages apply for each writer in the example of FIG. 6. This can, in certain embodiments, enable a plurality of writers to each write across a stripe in a RAID array, with a minimum of latency and queuing. If, instead of processes described above, writer_A through writer_J were to all start at the same time accessing all disks in order, the result would be, for example, at the first cycle, every one of writer_A through writer_J all attempting to access Disk D0, then access disk D1, etc. Even if the writers are cued to start at slightly different times (e.g., as described above in connection with the FOR loop, for D0 to D10), the writers can, in certain embodiments, quickly catch up with each other at a given disk, if one particular writer is taking longer than others.

In the above-described flow charts of FIGS. 1-6B, rectangular elements, herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Further, the processes and operations described herein can be performed by a computer especially configured for the desired purpose or by a general-purpose computer especially configured for the desired purpose by another computer program stored in a computer readable storage medium or in memory.

FIG. 7 is a simplified block diagram of an apparatus that may be used to implement at least a portion of the systems of FIGS. 1-6B and at least a portion of the processes FIG. 5. As shown in FIG. 7, computer 900 may include processor 902, volatile memory 904 (e.g., RAM), non-volatile memory 906 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 910 (e.g., a touchscreen, a display, and so forth) and input and/or output (I/O) device 908 (e.g., a mouse, a keyboard, etc.). Non-volatile memory 904 stores, e.g., journal data 904a, metadata 904b, and pre-allocated memory regions 904c. The non-volatile memory, 906 can include, in some embodiments, an operating system 914, and computer instructions 912, and data 916. In certain embodiments, the computer instructions 912 are configured to provide several subsystems, including a routing subsystem 912A, a control subsystem 912b, a data subsystem 912c, and a write cache 912d. In certain embodiments, the computer instructions 912 are executed by the processor/CPU 902 out of volatile memory 904 to perform at least a portion of the processes shown in FIGS. 2-8. Program code also may be applied to data entered using an input device or GUI 910 or received from I/O device 908.

The systems and processes of FIGS. 1-6B are not limited to use with the hardware and software described and illustrated herein and may find applicability in any computing or processing environment and with any type of machine or set of machines that may be capable of running a computer program. The processes described herein may be implemented in hardware, software, or a combination of the two. The logic for carrying out the method may be embodied as part of the system described in FIG. 8, which is useful for carrying out a method described with reference to embodiments shown in, for example, FIGS. 1-6B. The processes described herein are not limited to the specific embodiments described. For example, the processes of FIGS. 1-6B are not limited to the specific processing order shown in FIGS. 1-6B. Rather, any of the blocks of the processes may be re-ordered, combined, or removed, performed in parallel or in serial, as necessary, to achieve the results set forth herein.

Processor 902 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital, or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the program code is loaded into and executed by a machine, such as the computer of FIG. 7, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 7 shows Program Logic 924 embodied on a computer-readable medium 920 as shown, and wherein the Logic is encoded in computer-executable code configured for carrying out the reservation service process of this invention and thereby forming a Computer Program Product 922. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

The invention claimed is:

1. A computer implemented method, comprising:
configuring a storage system comprising a processor in operable communication with a storage device, the storage device responsive to input/output (I/O) requests to the storage device from a plurality of entities in operable communication with the storage system and providing access to a storage array comprising a plurality of disks, the array having a predetermined array access width W spanning the plurality of disks;
receiving a plurality of access requests to the plurality of disks from the plurality of entities, each respective entity in the plurality having a corresponding respective entity identifier that is unique within the plurality of entities;
defining a finite field P corresponding to the plurality of disks, wherein P has a size based at least in part on the array access width W, wherein if W is a prime number, then P=W and if W is not a prime number, then P=the nearest prime number that is greater than W;
computing, for each respective entity having at least one respective access request, a respective sequence interval H for the respective access request, wherein each respective H is computed based at least in part on the respective entity identifier and on the size of the finite field P, wherein each respective sequence interval H is configured so that H is not evenly divisible by P and that H is a number between 1 and (P−1);
selecting, from the plurality of disks, for each respective entity, a respective disk corresponding to a starting point for each respective access request;
generating, for each respective entity, a respective disk access sequence defining a respective disk access pattern for all disks in the array that the respective entity needs to access in accordance with one or more access requests associated with that respective entity, wherein each respective disk access sequence directs each respective entity to access at least a portion of the plurality of disks in a predetermined order, wherein the predetermined order increments from the starting point to subsequent disks in accordance with the respective sequence interval H for that respective entity, such that, when the disk access sequence is complete, the respective entity has accessed each disk in the portion of the plurality of disks only a predetermined number of times; and providing each respective entity access to the disks of the storage array in accordance with their respective disk access sequences;

wherein the access to the storage array in accordance with the respective disk access sequences, is configured to minimize at least one of disk latency and I/O latency.

2. The computer implemented method of claim 1, wherein the predetermined number of times comprises one time.

3. The computer implemented method of claim 1, wherein the storage array comprises a RAID array.

4. The computer implemented method of claim 1, wherein the predetermined array access width W comprises a stripe width.

5. The computer implemented method of claim 1, wherein the predetermined array access width comprises at least one of a prime number and a near-prime number.

6. The computer implemented method of claim 1, further comprising:

determining if any one or more of the plurality of disks is not available; and adjusting one or more of the disk access sequences to skip the one or more disks determined to be unavailable.

7. The computer implemented method of claim 1, wherein, if P is larger than W, then the method further comprises configuring the respective disk access sequence to skip over unused locations in the at least a portion of the plurality of disks that are included in the respective disk access sequence.

8. The computer implemented method of claim 1, wherein:

for each respective entity, the respective entity identifier is associated with a respective numerical value that is unique within the plurality of entities; and each respective sequence interval H is computed as H=entity identifier mod P.

9. A system, comprising:

a processor; and a non-volatile memory in operable communication with the processor and storing computer program code that when executed on the processor causes the processor to execute a process operable to perform the operations of:

configuring a storage system comprising a processor in operable communication with a storage device, the storage device responsive to input/output (I/O) requests to the storage device from a plurality of entities in operable communication with the storage system and providing access to a storage array comprising a plurality of disks, the array having a predetermined array access width W spanning the plurality of disks;

receiving a plurality of access requests to the plurality of disks from the plurality of the entities, each respective entity in the plurality having a corresponding respective entity identifier that is unique within the plurality of entities;

defining a finite field P corresponding to the plurality of disks wherein P has a size based at least in part on the array access width W wherein if W is a prime number, then P=W and if W is not a prime number, then P=the nearest prime number that is greater than W;

computing, for each respective entity having at least one respective access request a respective sequence interval H for the respective access request, wherein each respective H is computed based at least in part on the respective entity identifier and on the size of the finite field P, wherein each respective sequence interval H is configured so that H is not evenly divisible by P and that H is a number between 1 and (P−1);

selecting, from the plurality of disks, for each respective entity, a respective disk corresponding to a starting point for each respective access request;

generating, for each respective entity, a respective disk access sequence defining a respective disk access pattern for all disks in the array that the respective entity needs to access in accordance with one or more access requests associated with that respective entity, wherein each respective disk access sequence directs each respective entity to access at least a portion of the plurality of disks in a predetermined order, wherein the predetermined order increments from the starting point to subsequent disks in accordance with the respective sequence interval H for that respective entity, such that, when the disk access sequence is complete, the respective entity has accessed each disk in the portion of the plurality of disks only a predetermined number of times; and providing each respective entity access to the disks of the storage array in accordance with their respective disk access sequences;

wherein the access to the storage array in accordance with the respective disk access sequences, is configured to minimize at least one of disk latency and I/O latency.

10. The system of claim 9, wherein the predetermined number of times comprises one time.

11. The system of claim 9 wherein the predetermined array access width W comprises a stripe width.

12. The system of claim 9, wherein the storage array comprises a RAID array, and wherein the predetermined array access width W comprises a stripe width.

13. The system of claim 9, wherein, if P is larger than W, then the process is further configured to perform the operation of configuring the respective disk access sequence to skip over unused locations in the at least a portion of the plurality of disks that are included in the respective disk access sequence.

14. The system of claim 9, wherein the process is further configured to perform the operations of:

determining if any one or more of the plurality of disks is not available; and adjusting one or more of the disk access sequences to skip the one or more disks determined to be unavailable.

15. The system of claim 9, wherein:

for each respective entity, the respective entity identifier is associated with a respective numerical value that is unique within the plurality of entities; and each respective sequence interval H is computed as H=entity identifier mod P.

16. A computer program product including a non-transitory computer readable storage medium having computer program code encoded thereon that when executed on a processor of a computer causes the computer to operate a storage system, the storage system comprising a processor in operable communication with a storage device, the storage device responsive to input/output (I/O) requests to the storage device from a plurality of entities in operable communication with the storage system and providing access to a storage array comprising a plurality of disks, the array having a predetermined array access width W spanning the plurality of disks, the computer program product comprising:

computer program code for receiving a plurality of access requests to the plurality of disks from the plurality of the entities, each respective entity in the plurality having a corresponding respective entity identifier that is unique within the plurality of entities;

computer program code for defining a finite field P corresponding to the plurality of disks wherein P has a size based at least in part on the array access width W, wherein if W is a prime number, then P=W and if W is not a prime number, then P=the nearest prime number that is greater than W:

computer program code for computing, for each respective entity having at least one respective access request a respective a sequence interval H for the respective access request, wherein each respective H is computed based at least in part on the respective entity identifier and on the size of the finite field P, wherein each respective sequence interval H is configured so that H is not evenly divisible by P and that H is a number between 1 and (P−1);

computer program code for selecting, from the plurality of disks, for each respective entity, a respective disk corresponding to a starting point for each respective the access request;

computer program code for generating, for each respective entity, a respective disk access sequence defining a respective disk access pattern for all disks in the that the respective entity needs to access in accordance with one or more access requests associated with that respective entity, wherein each respective disk access sequence directs each respective entity to access at least a portion of the plurality of disks in a predetermined order, wherein the predetermined order increments from the starting point to subsequent disks in accordance with the respective sequence interval H for that respective entity, such that, when the disk access sequence is complete, the respective entity has accessed each disk in the portion of the plurality of disks only a predetermined number of times; and computer program code for providing each respective entity access to the disks of the storage array in accordance with their respective disk access sequences;

wherein the access to the storage array in accordance with the respective disk access sequences, is configured to minimize at least one of disk latency and I/O latency.

17. The computer program product of claim 16, wherein the predetermined number of times comprises one time.

18. The computer program product of claim 16, wherein the storage array comprises a RAID array, and wherein the predetermined array access width W comprises a stripe width.

19. The computer program product of claim 16, wherein, if P is larger than W, then the computer program product comprises computer program code for configuring the respective disk access sequence to skip over unused locations in the at least a portion of the plurality of disks that are included in the respective disk access sequence.

20. The computer program product of claim 16, wherein, for each respective entity, the respective entity identifier is associated with a respective numerical value that is unique within the plurality of entities; and each respective sequence interval H is computed as H=entity identifier mod P.

\* \* \* \* \*